United States Patent
Fallon et al.

(10) Patent No.: US 12,344,095 B2
(45) Date of Patent: Jul. 1, 2025

(54) SYSTEM AND METHOD FOR AN AGRICULTURAL APPLICATOR

(71) Applicant: CNH Industrial America LLC, New Holland, PA (US)

(72) Inventors: Derrick Fallon, Manitowoc, WI (US); Steven Winkel, Elkhart Lake, WI (US)

(*) Notice: Subject to any disclaimer, the term of this patent is extended or adjusted under 35 U.S.C. 154(b) by 477 days.

(21) Appl. No.: 17/972,213

(22) Filed: Oct. 24, 2022

(65) Prior Publication Data

US 2024/0131928 A1 Apr. 25, 2024
US 2024/0227555 A9 Jul. 11, 2024

(51) Int. Cl.
| | |
|---|---|
| *B60K 35/50* | (2024.01) |
| *B60R 11/02* | (2006.01) |
| *B60R 13/02* | (2006.01) |
| *B62D 33/06* | (2006.01) |
| *B60K 35/00* | (2006.01) |
| *B60K 35/26* | (2024.01) |
| *B60R 11/00* | (2006.01) |

(52) U.S. Cl.
CPC .......... *B60K 35/50* (2024.01); *B60R 11/0205* (2013.01); *B60R 11/0264* (2013.01); *B60R 13/0212* (2013.01); *B62D 33/0617* (2013.01); *B60K 35/00* (2013.01); *B60K 35/26* (2024.01); *B60R 2011/0028* (2013.01); *B60R 2011/0294* (2013.01); *B60Y 2200/22* (2013.01)

(58) Field of Classification Search
CPC .. B60K 35/50; B62D 33/073; B62D 33/0617; B60R 7/04; B60R 2011/0028; B60R 11/0205; B60R 11/0264; B60R 11/0294; B60R 13/0212

USPC ................... 296/190.08, 37.7, 214
See application file for complete search history.

(56) References Cited

U.S. PATENT DOCUMENTS

| | | | |
|---|---|---|---|
| 3,452,835 A | 7/1969 | Deli et al. | |
| 3,550,001 A * | 12/1970 | Hanley | H04L 13/02 455/345 |
| 3,773,378 A * | 11/1973 | Lewis | B62D 33/0612 312/246 |

(Continued)

FOREIGN PATENT DOCUMENTS

| | | |
|---|---|---|
| DE | 102012001137 A1 | 7/2013 |
| EP | 2944500 B1 | 12/2018 |

(Continued)

OTHER PUBLICATIONS

Machine Translation of EP3486118 (Year: 2025).*

(Continued)

*Primary Examiner* — Jason S Morrow
(74) *Attorney, Agent, or Firm* — Rebecca Henkel; Peter K. Zacharias; Rickard K. DeMille

(57) ABSTRACT

An agricultural vehicle can include a cab including a frame and a windshield. A vehicle seat can include positioned within the cab and longitudinally rearward of the windshield. A user interface can include positioned at least partially on an opposing side of the vehicle seat from the windshield. The user interface can include a housing operably coupled with the frame. A cover can include operably coupled with the housing with the cover defining a void therein and a lip portion. A component can be configured to extend laterally through the void. The lip portion can be positioned at least partially vertically below the component.

20 Claims, 8 Drawing Sheets

(56) References Cited

U.S. PATENT DOCUMENTS

| | | | | |
|---|---|---|---|---|
| 4,100,372 | A * | 7/1978 | Hypolite | H04R 1/02 |
| | | | | 381/1 |
| 4,421,190 | A * | 12/1983 | Martinson | B60K 35/00 |
| | | | | 180/90 |
| 4,818,010 | A * | 4/1989 | Dillon | B60R 11/02 |
| | | | | 340/936 |
| 5,040,990 | A * | 8/1991 | Suman | B60R 11/00 |
| | | | | 439/34 |
| 5,104,071 | A * | 4/1992 | Kowalski | B60R 11/0205 |
| | | | | 455/345 |
| 5,154,617 | A * | 10/1992 | Suman | H01R 31/08 |
| | | | | 296/37.7 |
| 5,810,300 | A | 9/1998 | Hostenske | |
| 7,010,841 | B2 * | 3/2006 | Donovan | B60R 11/02 |
| | | | | 29/423 |
| 7,090,186 | B2 * | 8/2006 | Quinno | B60R 11/0235 |
| | | | | 248/920 |
| 7,142,980 | B1 * | 11/2006 | Laverick | G01C 21/265 |
| | | | | 701/491 |
| 7,165,798 | B2 * | 1/2007 | Chamberlain | B60R 11/0205 |
| | | | | 296/37.1 |
| 8,182,018 | B2 | 5/2012 | Duplantis et al. | |
| 8,625,034 | B2 | 1/2014 | Campbell et al. | |
| 8,934,226 | B2 | 1/2015 | Smith | |
| 10,369,872 | B2 * | 8/2019 | Jackson | G05D 1/0088 |
| 10,583,783 | B2 | 3/2020 | Beauregard | |
| D907,566 | S * | 1/2021 | Ahn | D12/418 |
| 11,254,252 | B1 | 2/2022 | Salter et al. | |
| 11,781,291 | B2 * | 10/2023 | Nishigori | B60N 2/75 |
| | | | | 180/315 |
| 12,005,781 | B2 * | 6/2024 | Matthews | B60K 35/28 |
| 12,084,116 | B2 * | 9/2024 | Booth | B62D 25/07 |
| 2012/0229394 | A1 | 9/2012 | Ehrl et al. | |
| 2012/0256843 | A1 | 10/2012 | Epple et al. | |

FOREIGN PATENT DOCUMENTS

| | | |
|---|---|---|
| EP | 3486118 A1 * | 5/2019 |
| FR | 3066447 B1 | 1/2021 |
| JP | 2007-245807 A | 9/2007 |
| JP | 2017-077828 A | 4/2017 |
| WO | WO 2009/123422 | 10/2009 |

OTHER PUBLICATIONS

"Croplands Rogator C Series Sets Standard for Smart Spraying," Australasian Farmers' & Dealers' Journal Sep. 21, 2017 (6 pages) https://afdj.com.au/croplands-rogator-c-series-sets-standard-smart-spraying/.

"Fendt Rogator 600" (15 pages) https://www.fendt.com/int/rogator-600-highlights.

John Deere "Parts, Services and Attachments Marketing Sprayer Parts" Attachments for R4023 Self Propelled Sprayer Mar. 14, 2016 (2 pages) https://jdparts.deere.com/partsmkt/unsecured/document/english/pmac/57157_Attachments_R4023_SP_Sprayer.htm.

John Deere "R41 Series With 401/50i Sprayers" (4 pages) https://www.deere.co.uk/en/sprayers/r41-series/.

Case IH "AFS Connect™ Magnum™ Series" (1 page) https://vx.caseih.com/northamerica/en-su/phase/field/1.

Jumia "Car Stereo with Bluetooth USB AUX MP FM Receiver+ Key" (5 pages) https://www.jumia.com/ng/generic-car-stereo-with-bluetooth-usb-aux-mp-fm-receiverkey-holder-11350794.html.

* cited by examiner

SYSTEM AND METHOD FOR AN AGRICULTURAL APPLICATOR

FIELD

The present disclosure generally relates to agricultural vehicles and, more particularly, to systems and methods for components that may be positioned within the agricultural vehicle.

BACKGROUND

Agricultural vehicles may perform various tasks within an agricultural field. For example, an applicator (e.g., sprayers, floaters, etc.) can deliver an agricultural product to a ground surface of a field. However, other agricultural vehicles may perform other tasks. During the operation of the agricultural vehicle, various components may be used to monitor various functions of the agricultural vehicle. Accordingly, an improved system and method for positioning the components of the agricultural vehicle within a cab of the vehicle would be welcomed in the technology.

BRIEF DESCRIPTION

Aspects and advantages of the technology will be set forth in part in the following description, or may be obvious from the description, or may be learned through practice of the technology.

In some aspects, the present subject matter is directed to an agricultural vehicle that includes a cab including a frame and a windshield. A vehicle seat is positioned within the cab and is longitudinally rearward of the windshield. A user interface is positioned at least partially on an opposing side of the vehicle seat from the windshield. The user interface includes a housing operably coupled with the frame, a cover operably coupled with the housing, the cover defining a void therein and a lip portion, and a component extending laterally through the void, wherein the lip portion is positioned at least partially vertically below the component.

In some aspects, the present subject matter is directed to a method of manufacturing a user interface for an agricultural vehicle. The method includes forming a headliner and forming a housing. The method also includes operably coupling the housing with the headliner. The housing is configured to be positioned rearwardly of a vehicle seat within a cab. The method further includes operably coupling a cover to the housing. Lastly, the method includes installing one or more components within respective voids defined by the cover.

In some aspects, the present subject matter is directed to a user interface for an agricultural vehicle. The user interface includes a housing configured to be positioned at least partially longitudinally rearward of a vehicle seat within a cab. A cover is operably coupled with the housing. The cover defines a lip portion. A component is positioned within an interior space defined by the housing and the cover in combination. The lip portion is positioned at least partially laterally inward of the component.

These and other features, aspects, and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
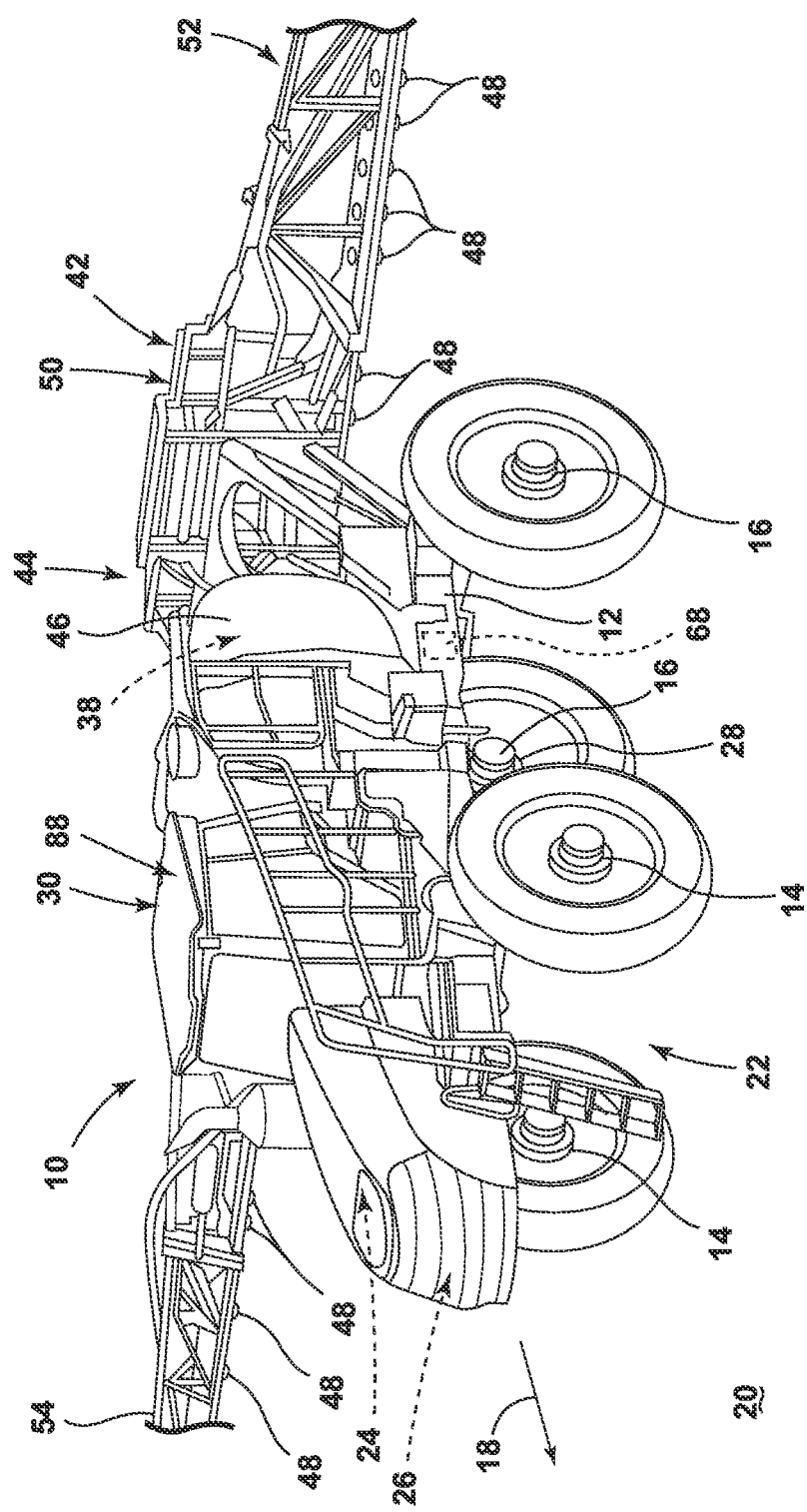
FIG. 1 illustrates a perspective view of an agricultural vehicle in accordance with aspects of the present subject matter.

Repeat use of reference characters in the present specification and drawings is intended to represent the same or analogous features or elements of the present technology.

DETAILED DESCRIPTION

Reference now will be made in detail to embodiments of the disclosure, one or more examples of which are illustrated in the drawings. Each example is provided by way of explanation of the discourse, not limitation of the disclosure. In fact, it will be apparent to those skilled in the art that various modifications and variations can be made in the present disclosure without departing from the scope or spirit of the disclosure. For instance, features illustrated or described as part can be used with another embodiment to yield a still further embodiment. Thus, it is intended that the present disclosure covers such modifications and variations as come within the scope of the appended claims and their equivalents.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the terms "first," "second," and "third" may be used interchangeably to distinguish one component from another and are not intended to signify a location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein. The terms "upstream" and "downstream" refer to the relative direction with respect to an agricultural product within a fluid circuit. For example, "upstream" refers to the direction from which an agricultural product flows, and "downstream" refers to the direction to which the agricultural product moves. The term "selectively" refers to a component's ability to operate in various states (e.g., an ON state and an OFF state) based on manual and/or automatic control of the component.

Furthermore, any arrangement of components to achieve the same functionality is effectively "associated" such that the functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable, physically interacting components, wirelessly interactable, wirelessly interacting components, logically interacting, and/or logically interactable components.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

As used herein, a "longitudinal" direction refers to the direction from a forward portion of a vehicle to a rear portion of the vehicle to define a longitudinal axis or a vehicle centerline of the vehicle. A "lateral" direction refers to a vehicle side-to-side direction that is perpendicular to the longitudinal direction. A "vertical" direction refers to a direction from a ground surface to an upper portion or roof of the vehicle. A first component may be "inward" of a second component when the first component is laterally closer to the vehicle centerline than the second component. Conversely, a first component may be "outward" of a second component when the first component is laterally further to the vehicle centerline than the second component.

In general, in some implementations, the present subject matter is directed to an agricultural vehicle that can include a cab having a frame and a windshield. A vehicle seat can be positioned within the cab and can be longitudinally rearward of the windshield. A user interface can be positioned at least partially on an opposing side of the vehicle seat from the windshield.

In various examples, the user interface can include a housing operably coupled with the frame. A cover operably can be coupled with the housing. The cover can define a void therein and/or a lip portion. A component can extend laterally through the void and the lip portion can be positioned at least partially vertically below the component. The component may be a wide range of components, such as an ignition assembly, one or more switch assemblies, a receiver unit for an audio system, and/or any other component, that may be positioned within a cab of a vehicle.

In some instances, the lip portion can form a handle and/or a contact portion of the housing. When interacting with the user interface, a user may contact the lip portion. Additionally or alternatively, when an operator is moving to a seated position within the cab and/or leaving a seated position within the cab, a passenger of the vehicle may contact the lip portion for assistance in movement around the cab.

Figure 2:
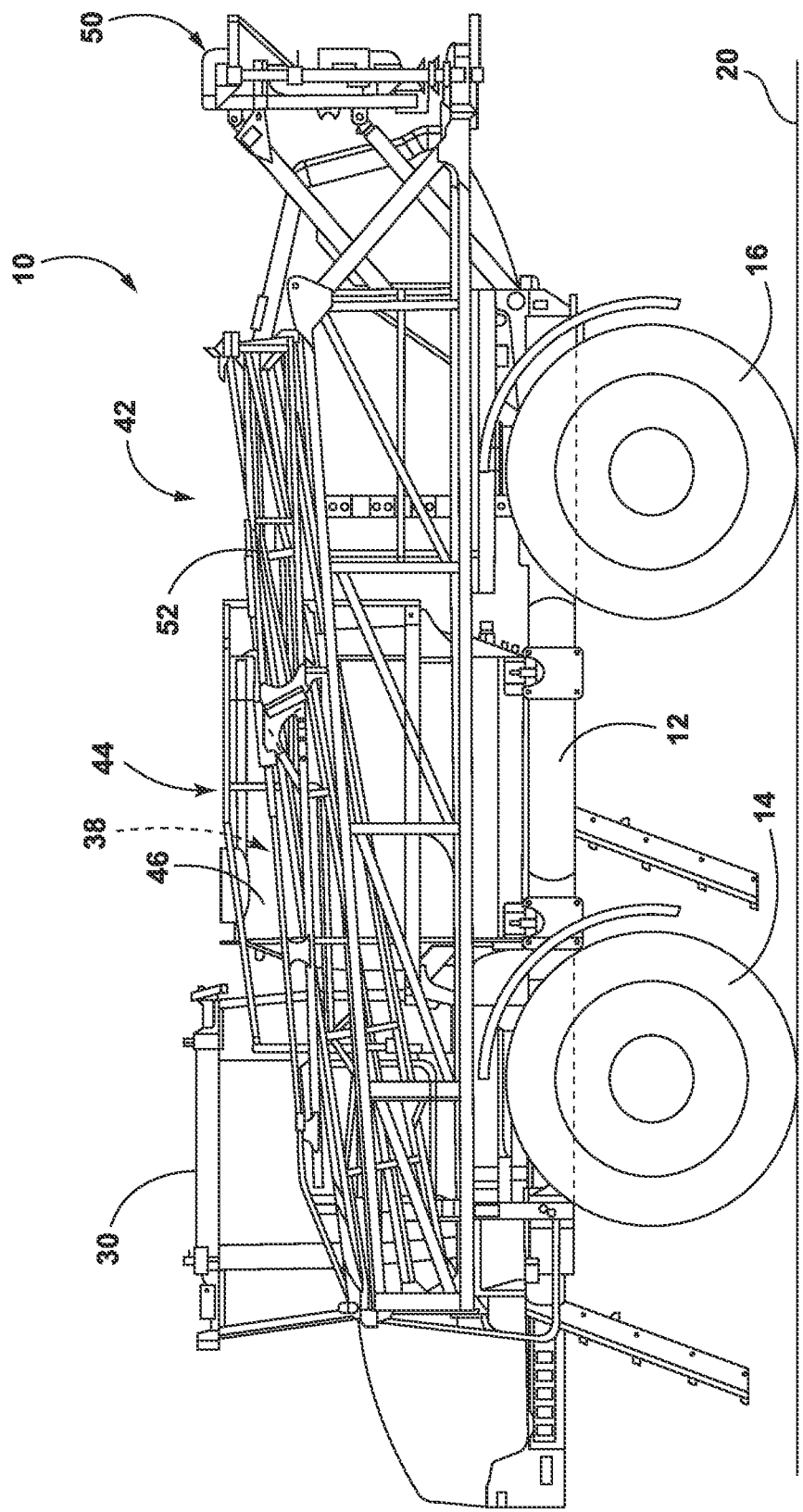
FIG. 2 illustrates a side view of the vehicle in accordance with aspects of the present subject matter.

Referring now to FIGS. 1 and 2, a work vehicle 10 is generally illustrated as a self-propelled agricultural applicator. However, in alternate embodiments, the work vehicle 10 may be configured as any other suitable type of work vehicle 10 configured to perform agricultural application operations, such as a tractor or other vehicle configured to haul or tow an application implement, or any other operation.

In various embodiments, the work vehicle 10 may include a chassis 12 configured to support or couple to a plurality of components. For example, front and rear wheels 14, 16 may be coupled to the chassis 12. The wheels 14, 16 may be configured to support the work vehicle 10 relative to a field 20 and move the work vehicle 10 in a direction of travel (e.g., as indicated by arrow 18 in FIG. 1) across the field 20. In this regard, the work vehicle 10 may include a powertrain control system 22 that includes a power plant 24, such as an engine, a motor, or a hybrid engine-motor combination, a hydraulic propel or transmission system 26 configured to transmit power from the engine to the wheels 14, 16, and/or a brake system 28.

The chassis 12 may also support a cab 30, or any other form of user's station, for permitting the user to control the operation of the work vehicle 10. For instance, various devices may be positioned within the cab 30 that allows the user to interface with the vehicle's controller.

The chassis 12 may also support a boom assembly 42 mounted to the chassis 12. In addition, the chassis 12 may support a product application system 44 that includes one or more tanks 46, such as a rinse tank and/or a product tank.

The product tank is generally configured to store or hold an agricultural product 38, such as a pesticide, a fungicide, a rodenticide, a nutrient, and/or the like. The agricultural product 38 is conveyed from the product tank through plumbing components, such as interconnected pieces of tubing, for release onto the underlying field 20 (e.g., plants and/or soil) through one or more nozzle assemblies 48 mounted on the boom assembly 42.

As shown in FIGS. 1 and 2, the boom assembly 42 can include a frame 50 that supports first and second boom arms 52, 54, which may be orientated in a cantilevered nature. The first and second boom arms 52, 54 are generally movable between an operative or unfolded position (FIG. 1) and an inoperative or folded position (FIG. 2). When distributing the product, the first and/or second boom arm 52, 54 extends laterally outward from the work vehicle 10 to cover swaths of the underlying field 20, as illustrated in FIG. 1. However, to facilitate transport, each boom arm 52, 54 of the boom assembly 42 may be independently folded forwardly or rearwardly into the inoperative position, thereby reducing the overall width of the vehicle 10, or in some examples, the overall width of a towable implement when the applicator is configured to be towed behind the work vehicle 10.

Figure 3:
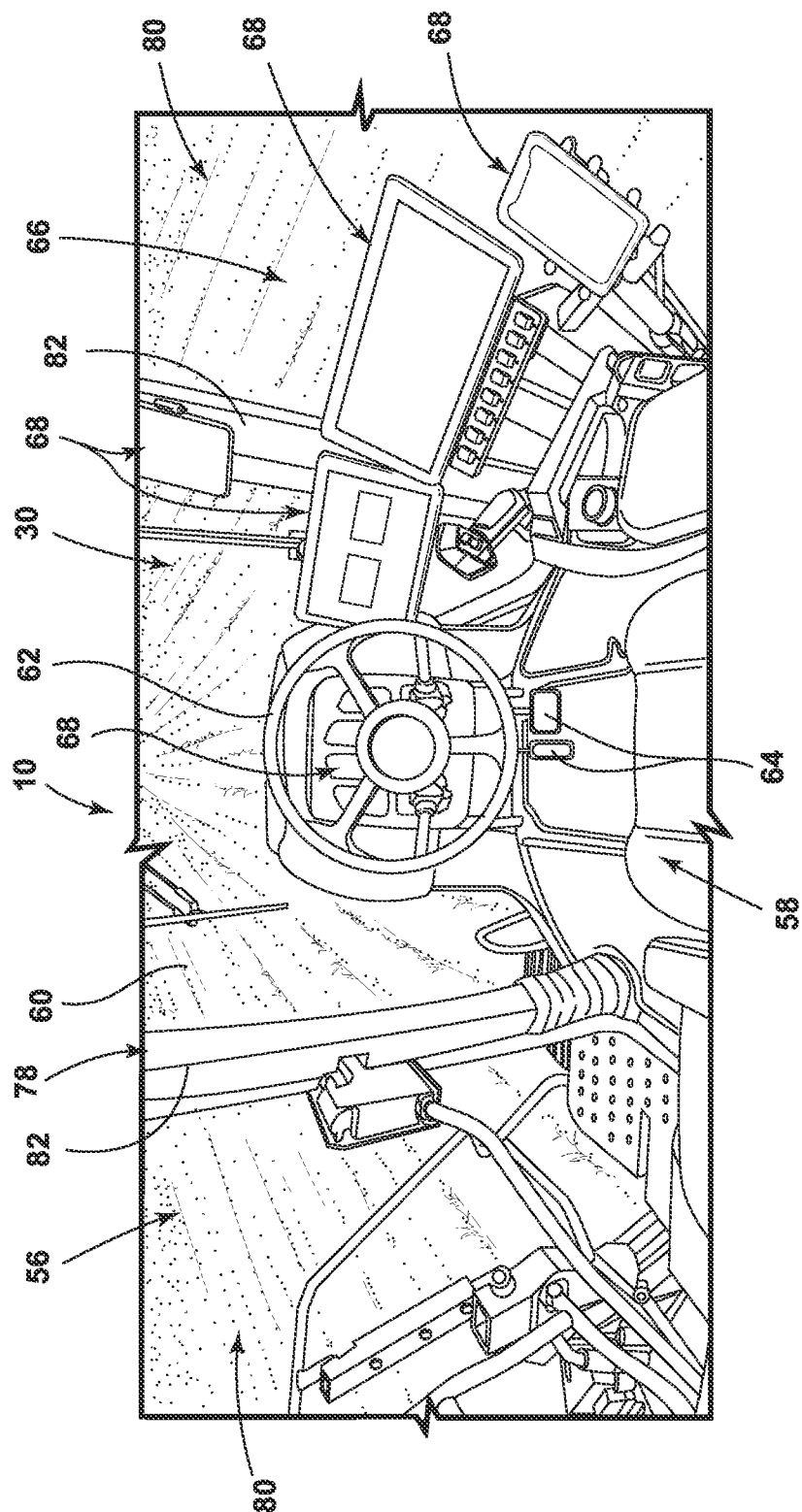
FIG. 3 is a perspective view of a front portion of a cab of a vehicle in accordance with aspects of the present subject matter.
Figure 4:
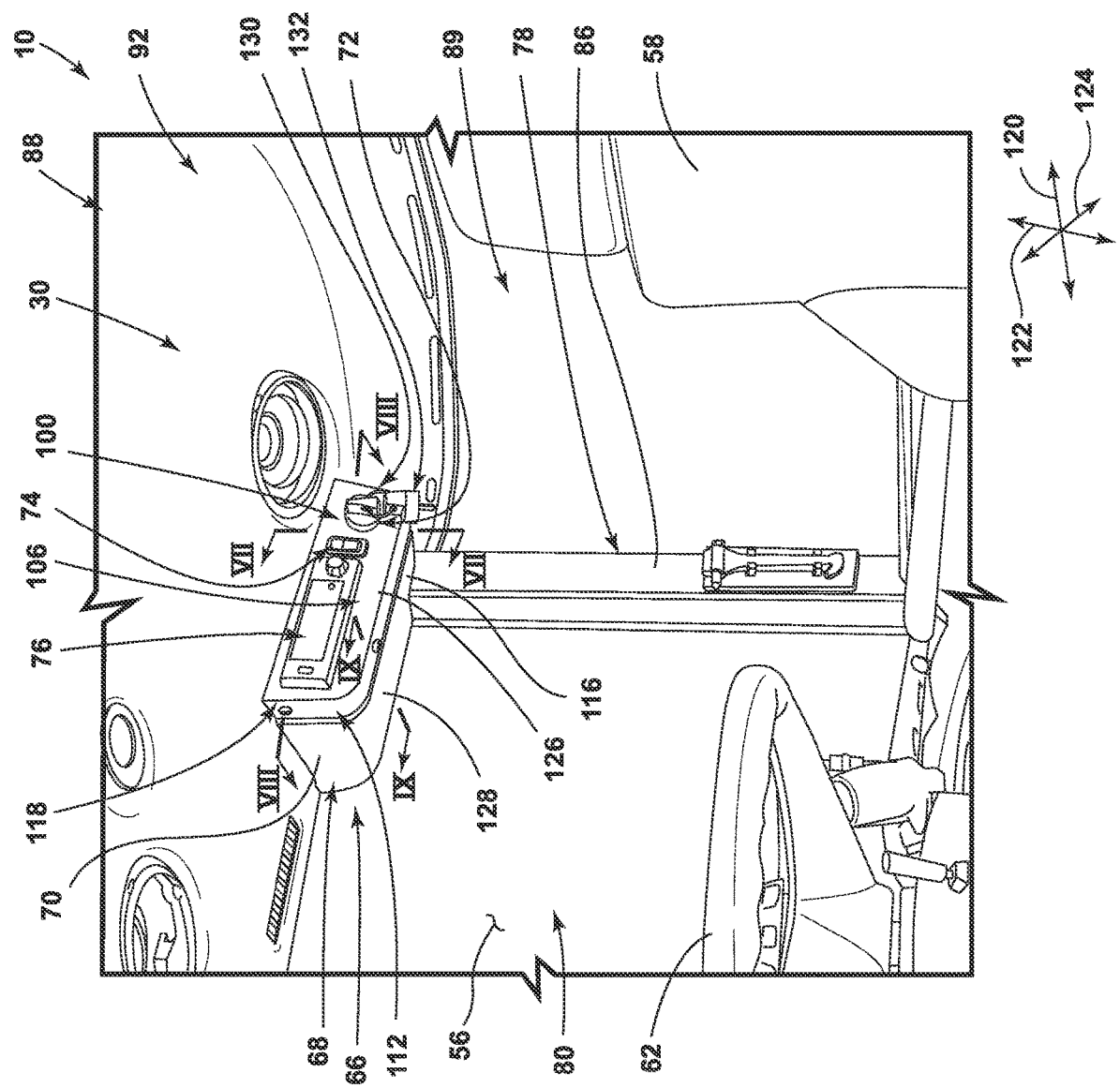
FIG. 4 is a perspective view of a rear portion of the cab of the vehicle in accordance with aspects of the present subject matter.
Figure 5:
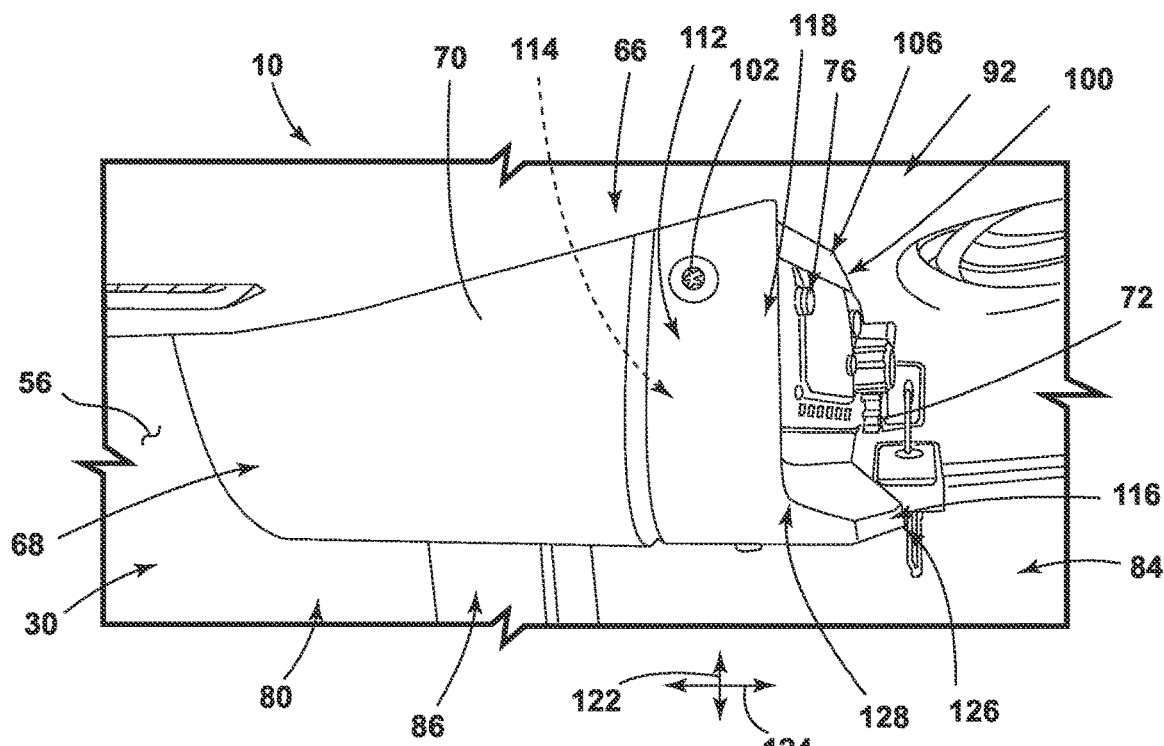
FIG. 5 is a perspective view of a side portion of a user interface within the cab of the vehicle in accordance with aspects of the present subject matter.
Figure 6:
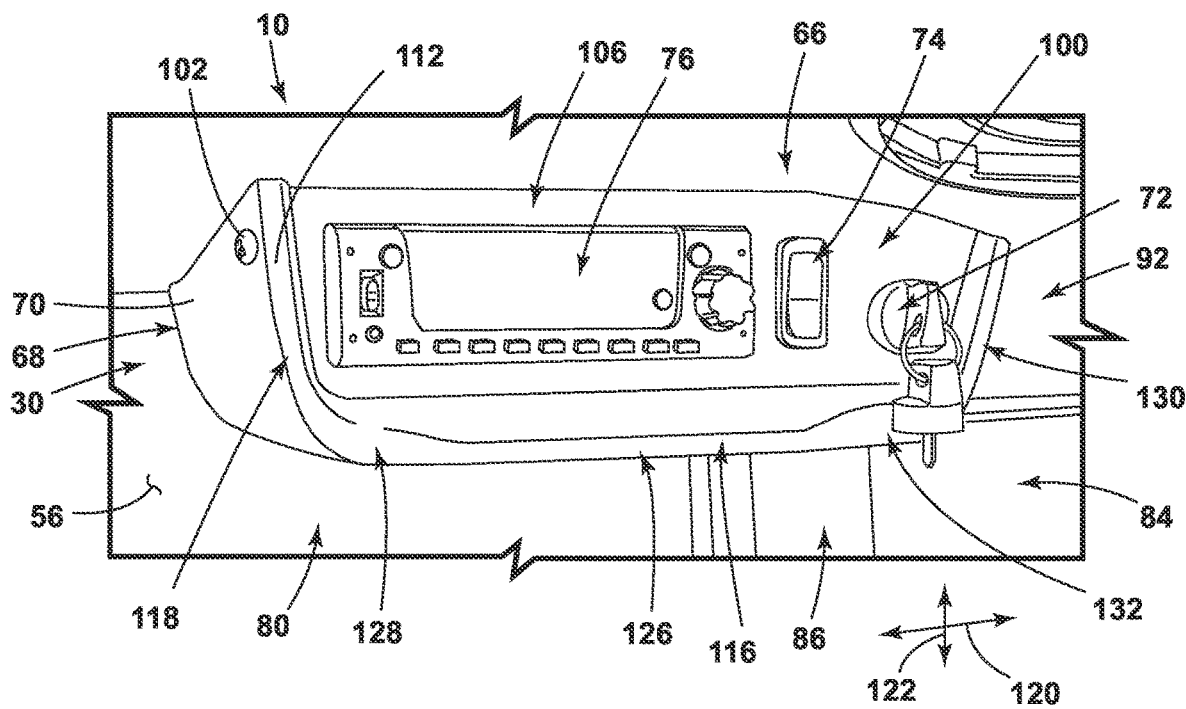
FIG. 6 is a perspective view of a front portion of a user interface within the cab of the vehicle in accordance with aspects of the present subject matter.
Figure 7:
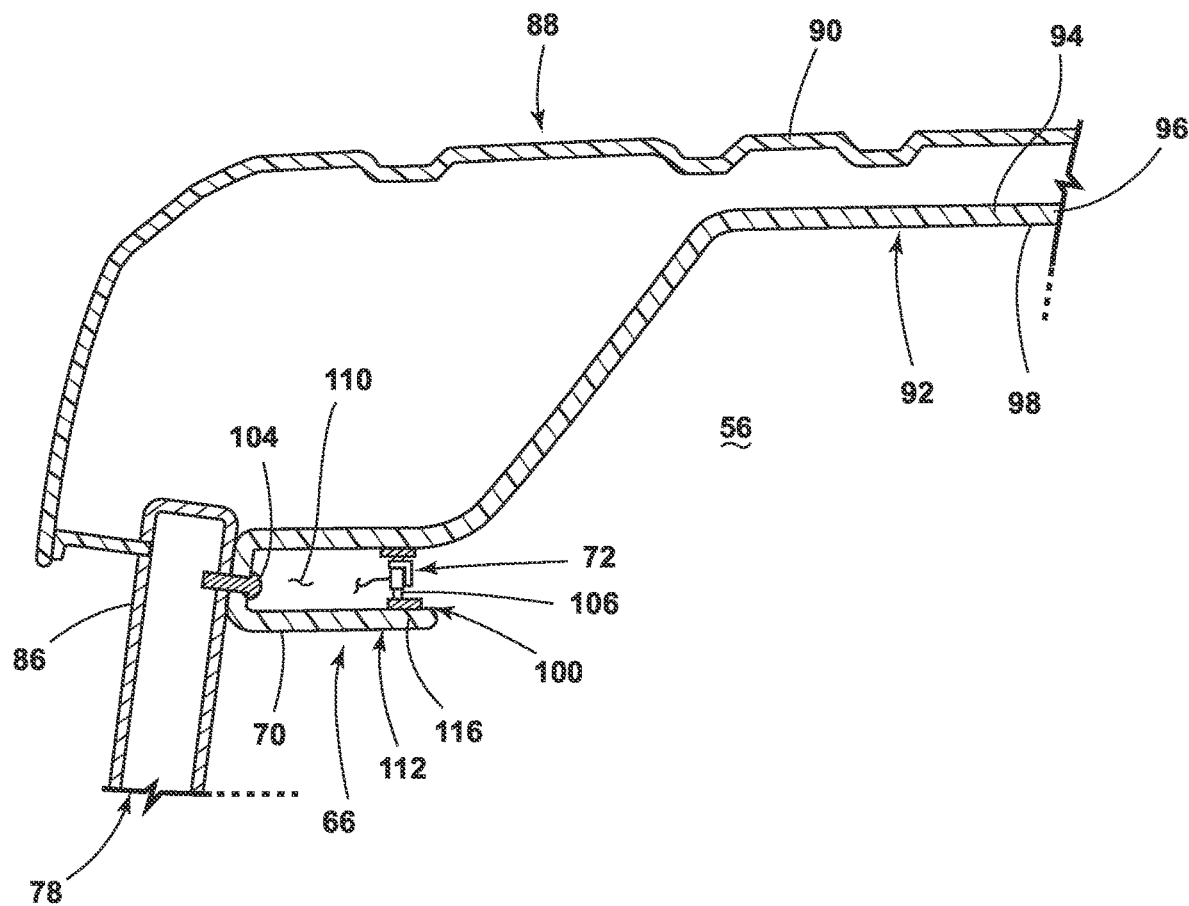
FIG. 7 is a cross-sectional view taken along the line VII-VII of FIG. 4.

Referring now to FIGS. 3 and 4, an interior 56 of the cab 30 of the vehicle 10 may include a seat 58, on which the operator sits when operating the vehicle 10. In general, the seat 58 can face forwardly towards a windshield or a forward portion of the vehicle 10. In various embodiments, a steering wheel 62 is located near the seat 58, so as to be within arm's reach of the operator when the operator is seated. Though a steering wheel 62 is included in the illustrated embodiment, other embodiments of the vehicle 10 may include other devices for receiving steering inputs from the operator. For example, in place of a steering wheel 62, the cab 30 may have left/right control bars, a hand controller, pedals, or another suitable device for receiving steering inputs. The vehicle 10 may further include one or more pedals 64 that may be configured to receive input from the operator for controlling the speed of the vehicle 10. For example, the pedals 64 may control a throttle, brakes, a clutch, other suitable systems, or a combination thereof. In other embodiments, the pedals 64 may be used for steering inputs. Further, in embodiments in which the vehicle 10 is semi-autonomous or fully autonomous, the steering wheel 62 and/or the pedals 64 may be omitted.

The cab 30 may further include a human-machine interface (HMI) 66 that may be positioned within the cab 30 and configured to present information to the operator, such as vehicle information (e.g., ground speed, oil pressure, engine temperature, etc.), implement operations information (e.g., rotor speed and grain loss), and manufacturer proprietary systems information (e.g. Advanced Farming Systems (AFS) information, including yield maps, position data, etc.), occupant systems (e.g., audio system information, HVAC system information, etc.). In various examples, the HMI 66 may include various displays and systems each positioned within the cab 30. For example, one or more user interfaces 68, which can each include one or more displays and/or input devices, may be positioned forwardly of the vehicle seat 58 that allows for the operator to control various functions of the vehicle 10.

Additionally or alternatively, the HMI 66 can include one or more user interfaces 68 positioned at least partially rearward, or at least partially on an opposing side, of the vehicle seat 58 from the windshield 60 of the cab 30. In some cases, the user interface 68 that is positioned rearwardly of the seat 58 may include a housing 70 that operably supports various components, such as an ignition assembly 72, one or more switch assemblies 74, a receiver unit 76 for an audio system, and/or any other component.

As illustrated in FIGS. 3 and 4, the cab 30 may include a frame 78 that includes one or more side panels 80 that are laterally outward of the seat 58 and longitudinally rearward of the windshield 60. In some instances, the side panels 80 may be separated from and/or at least partially longitudinally rearward of an A-pillar 82 of the frame 78. In various examples, the side panel 80 may be in the form of a window and/or have transparent portions thereof. The cab 30 may additionally include a rear panel 84 that is at least partially laterally inward of the side panel 80 and at least partially longitudinally rearward of the side panels 80. In some instances, the rear panel 84 may be separated from a B-pillar 86 of the frame 78. In various examples, the rear panel 84 may be in the form of a window and/or have transparent portions thereof.

Referring to FIGS. 4-9, a roof assembly 88 may be positioned vertically above the windshield 60, the side panels 80, the rear panel 84, the A-pillar 82, and/or the B-pillar 86. In some examples, the roof assembly 88 can include a roof panel 90 that forms an external roof of the cab 30 and a headliner 92 that is positioned between the roof panel 90 and the seat 58. The roof panel 90 may be supported by the A-pillar 82, the B-pillar 86, and/or any other portion of the cab 30 frame 78. The roof panel 90 may be made from a metallic material, a polymeric material, a composite material, and/or any other material. The headliner 92 can include a substrate 94, a deformable layer 96, and/or a decorative layer 98. The substrate 94 may be generally rigid to maintain a defined shape. The deformation may be positioned on an opposite side of the substrate 94 from the roof panel 90. In various examples, the deformable layer 96 may be formed from foam and/or any other deformable material, which allows for elastic deformation and/or acoustical dampening. The decorative layer 98 can be positioned on an opposing side of the deformable layer 96 from the substrate 94. In some examples, the decorative layer 98 may be formed from a fabric material and/or any other practicable material. In various examples, ancillary equipment can be integrated into the roof assembly 88. Exemplary equipment may include items such as interior and exterior lights, speakers for the audio system, vents for a venting system, etc.

With further reference to FIGS. 4-9, the user interface 68 may include a housing 70 and a cover 100 operably coupled with the housing 70 through one or more fasteners 102. The cover 100 may be operably coupled and/or integrally formed with the housing 70. The housing 70 and/or the cover 100 may be at least partially rigid and formed from a polymeric material, a metallic material, an elastomeric material, a composite material, and/or any other practice material. In some examples, the housing 70 may be integrally formed with the headliner 92 and/or operably coupled therewith. In addition, in various examples, the housing 70 may be operably coupled with the B-pillar 86 and/or any other component of the frame 78 through one or more fasteners 104.

The cover 100 may include a component portion 106 that defines one or more voids 108 through which various components, such as the ignition assembly 72, the one or more switch assemblies 74, the receiver unit 76 for an audio system, and/or any other component may extend. In combination, the housing 70 and the cover 100 may define an interior space 110. At least a portion of the ignition assembly 72, the one or more switch assemblies 74, and/or the receiver unit 76 for the audio system may be positioned within the space. The portions of each of the ignition assembly 72, the one or more switch assemblies 74, and/or the receiver unit 76 for an audio system that are positioned within the interior space 110 may be concealed from viewing from the cab 30 when positioned within the interior space 110.

As illustrated, the cover 100 may also define an attachment portion 112 that is laterally outward or at least partially extends in a first direction from the component portion 106. In some cases, the attachment portion 112 may be positioned outwardly of an attachment region 114 of the housing 70. In some examples, the attachment portion 112 may have a thickness that is greater than a thickness of the attachment region 114 of the housing 70. However, it will be appreciated that, in some examples, the thickness of the attachment portion 112 may be less than the thickness of the attachment region 114. Alternatively, the thickness of the attachment portion 112 may be generally equal to the thickness of the attachment region 114.

The cover 100 may further define a lip portion 116 that is laterally inward or at least partially extends in a second direction from the component portion 106 that is opposite to the first direction. As illustrated, in some examples, the lip portion 116 can include a first segment 118 that is positioned at least partially on a first side of the one or more components within the user interface 68 in a longitudinal direction (indicated by arrow 120). The first segment 118 can also extend at least partially above and/or at least partially below the one or more components in a vertical direction (indicated by arrow 122) and/or inwardly of the one or more components in a lateral direction (indicated by arrow 124). The lip portion 116 can also include a second segment 126 that is positioned at least partially vertically below the one or more components within the user interface 68 and is coupled with the first segment 118 through a first transition segment 128. The second segment 126 can also extend at least partially inwardly of the one or more components in a lateral direction. Additionally, the lip portion 116 can include a third segment 130 that is positioned at least partially on a second side of the one or more components within the user interface 68 in a longitudinal direction that is opposite the first side. In addition, the third segment 130 may be coupled with the second segment 126 through a second transition segment 132. The third segment 130 can also extend at least partially above and/or at least partially below the one or more components in a vertical direction and inwardly of the one or more components in a lateral direction.

Any segments 118, 126, 128, 130, 132 of the lip portion 116 may have a varied thickness from any of the remaining segments 118, 126, 128, 130, 132. Moreover, in various examples, the lip portion 116 can form a handle and/or a contact portion of the housing 70. When interacting with the user interface 68, a user may contact the lip portion 116. Additionally or alternatively, when an operator is moving to a seated position within the cab 30 and/or leaving a seated position within the cab 30, a passenger of the vehicle 10 may contact the lip portion 116 for assistance in movement around the cab 30.

Figure 8:
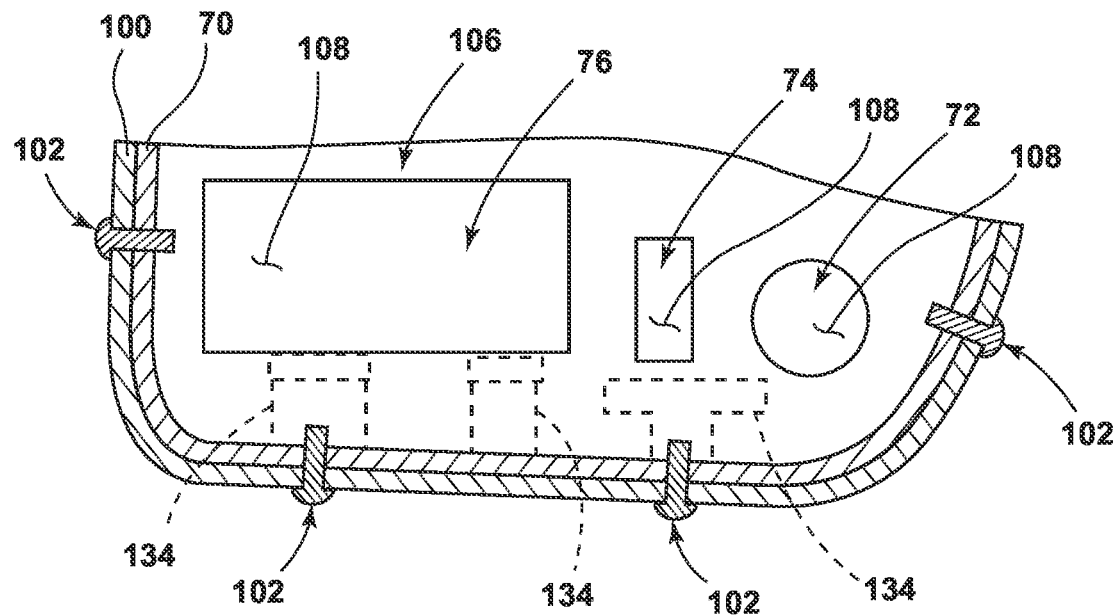
FIG. 8 is a cross-sectional view taken along the line VIII-VIII of FIG. 4.
Figure 9:
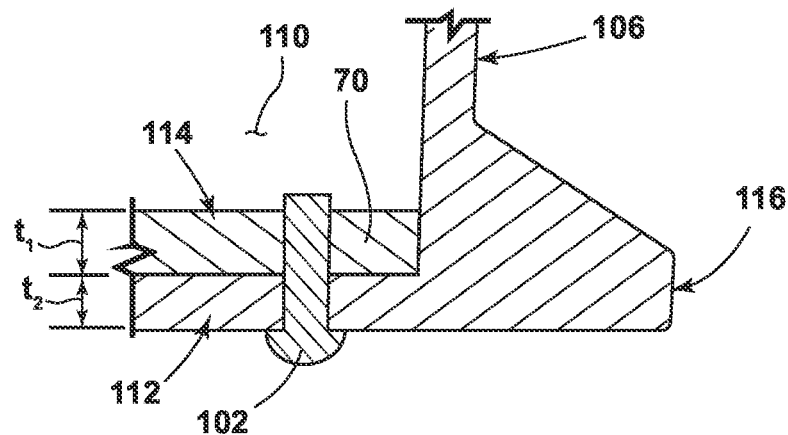
FIG. 9 is a cross-sectional view taken along the line IX-IX of FIG. 4.

With further reference to FIG. 8, in some cases, one or more braces 134 may be positioned within the interior space 110 defined by the housing 70 and the cover 100 in combination. The braces 134 may operably couple to one or more of the components are prevented vibration of the components during the use of the vehicle 10. The braces 134 may be operably coupled with the housing 70, the headliner 92, the frame 78, and/or any other component of the vehicle 10.

Figure 10:
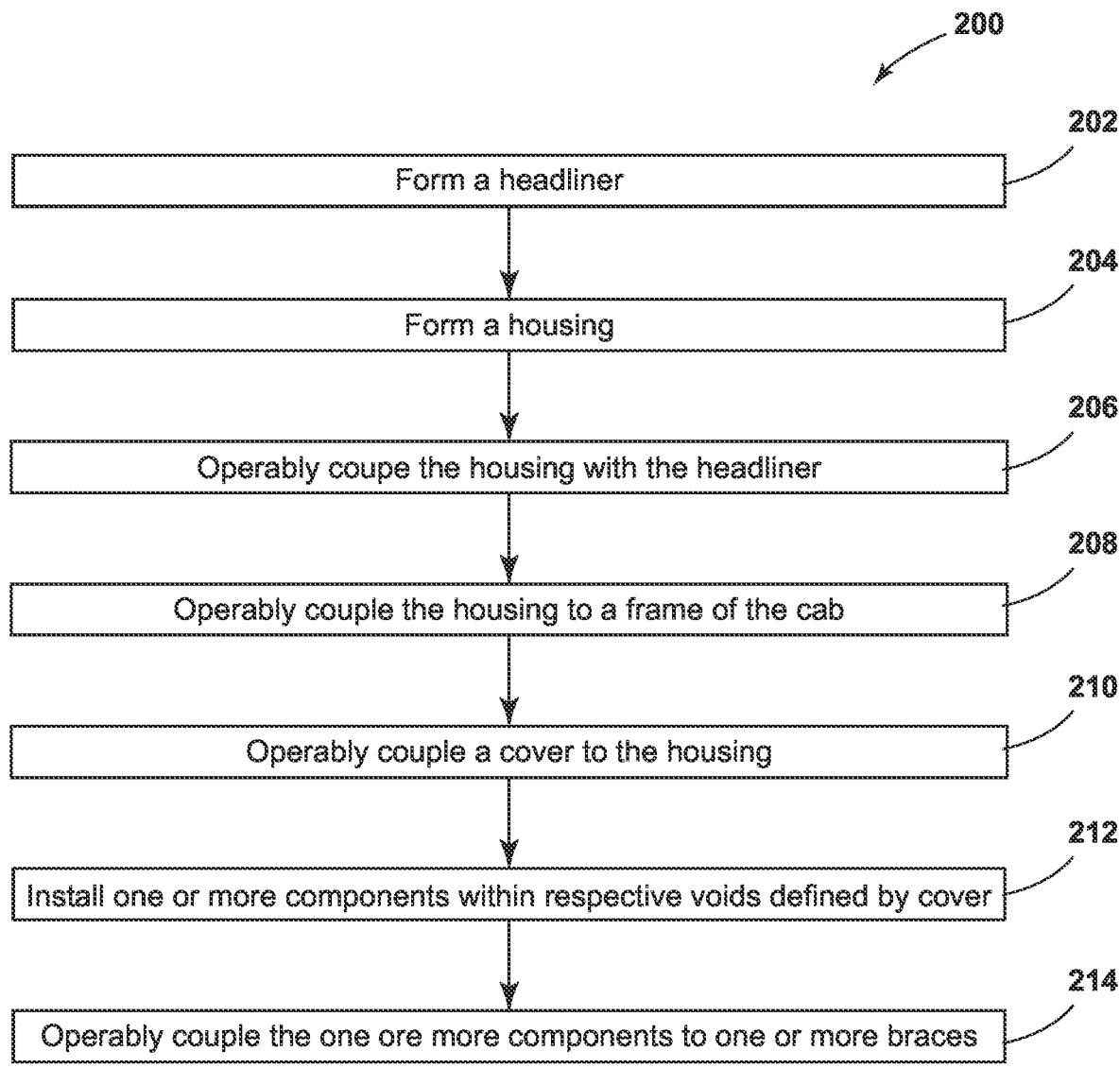
FIG. 10 illustrates a flow diagram of a method of manufacturing a user interface for an agricultural vehicle in accordance with aspects of the present subject matter.

Referring now to FIG. 10, a flow diagram of some embodiments of a method of manufacturing a user interface for an agricultural vehicle is illustrated in accordance with aspects of the present subject matter. In general, the method 200 will be described herein with reference to the vehicle 10 and the user interface 68 described above with reference to FIGS. 1-9. However, the disclosed method 200 may generally be utilized with any suitable agricultural vehicle 10 and/or may be utilized in connection with any other suitable configuration. In addition, although FIG. 10 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As illustrated in FIG. 10, at (202), the method can include forming a headliner. As provided herein, the headliner can include a substrate, a deformable layer, and/or a decorative layer. The substrate may be generally rigid to maintain a defined shape. The deformation may be positioned on an opposite side of the substrate from the roof panel. At (204), the method 200 can also include forming a housing for a user interface. The housing is configured to operably support various components, such as an ignition assembly, one or more switch assemblies, a receiver unit for an audio system, and/or any other component.

At (206), the method 200 can include operably coupling the housing with the headliner. In various examples, operably coupling the housing with the headliner can include integrally forming the housing with the substrate of the headliner and/or operably coupling the substrate with the housing. As provided herein, the housing can be configured to be positioned rearwardly of a vehicle seat within a cab. However, it will be appreciated that the housing may be positioned within any portion of the cab without departing from the teachings provided herein.

At (208), the method 200 can include operably coupling the housing to a frame of the cab. As provided herein, the frame can include A-pillar, a B-pillar, and/or any other structure that may support a windshield, side panels, and/or a rear panel. In such instances, the housing may be operably coupled to the frame through one or more suitable fasteners. For instance, one or more fasteners may be utilized to attach the housing to the frame.

At (210), the method 200 can include operably coupling a cover to the housing. In various examples, the cover may be operably coupled to the housing with one or more fasteners. Additionally or alternatively, one or more other methods may be utilized for coupling the cover to the housing, such as through the use of adhesives, locking features, and/or any other manner. As provided herein, the cover may include a component portion that defines one or more voids through which various components, such as the ignition assembly, the one or more switch assemblies, the receiver unit for an audio system, and/or any other component may extend. In combination, the housing and the cover may define an interior space.

The cover may further define a lip portion that is laterally inward or at least partially extends in a second direction from the component portion that is opposite to the first direction. As illustrated, in some examples, the lip portion can include a first segment that is positioned at least partially on a first side of the one or more components within the user interface in a longitudinal direction. The first segment can also extend at least partially above and/or at least partially below the one or more components in a vertical direction and inwardly of the one or more components in a lateral direction. The lip portion can also include a second segment that is positioned at least partially vertically below the one or more components within the user interface and is coupled with the first segment through a first transition segment. The second segment can also extend at least partially inwardly of the one or more components in a lateral direction. Additionally, the lip portion can include a third segment that is positioned at least partially on a second side of the one or more components within the user interface in a longitudinal direction that is opposite the first side. In addition, the third segment may be coupled with the second segment through a second transition segment. The third segment can also extend at least partially above and/or at least partially below the one or more components in a vertical direction and inwardly of the one or more components in a lateral direction.

At (210), the method 200 can include installing one or more components within respective voids defined by the cover. In some cases, at least a portion of the ignition assembly, the one or more switch assemblies, and/or the receiver unit for the audio system may be positioned within the space. The portions of each of the ignition assembly, the one or more switch assemblies, and/or the receiver unit for an audio system that are positioned within the interior space may be concealed from viewing from the cab when positioned within the interior space.

At (212), the method 200 can include operably coupling the one or more components to one or more braces positioned within the interior space defined by the housing and the cover in combination. The braces may operably couple to one or more of the components are prevented vibration of the components during the use of the vehicle.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. An agricultural vehicle comprising:
   a cab including a frame and a windshield;
   a vehicle seat positioned within the cab and longitudinally rearward of the windshield; and
   a user interface positioned at least partially on an opposing side of the vehicle seat from the windshield, the user interface comprising:
      a housing operably coupled with the frame;
      a cover operably coupled with the housing, the cover defining a void therein and a lip portion; and
      a component extending laterally through the void, wherein the lip portion is positioned at least partially vertically below the component.

2. The vehicle of claim 1, wherein the component is a head unit of a vehicle audio system.

3. The vehicle of claim 1, wherein the component is one or more electrical switches.

4. The vehicle of claim 1, wherein the component is an ignition assembly.

5. The vehicle of claim 1, wherein the lip portion extends laterally inward of the component.

6. The vehicle of claim 1, wherein the lip portion comprises:
   a first segment positioned at least partially on a first side of the component in a longitudinal direction;
   a second segment positioned at least partially vertically below the component, the second segment coupled with the first segment through a first transition segment; and
   a third segment positioned at least partially on a second side of the component in a longitudinal direction that is opposite the first side, the third segment coupled with the second segment through a second transition segment.

7. The vehicle of claim 6, wherein the first segment extends at least partially above and at least partially below the component in a vertical direction and inwardly of the component in a lateral direction, the second segment extends at least partially inwardly of the component in a lateral direction, and the third segment extends at least partially above and at least partially below the component in a vertical direction and inwardly of the component in a lateral direction.

8. The vehicle of claim 1, further comprising:
   a headliner within the cab, the headliner including a substrate,
   wherein the housing is integrally formed with the substrate.

9. The vehicle of claim 1, wherein the frame includes one or more pillars, and wherein the housing is operably coupled with the pillar through one or more fasteners.

10. A method of manufacturing a user interface for an agricultural vehicle, the method comprising:
    forming a headliner;
    forming a housing;
    operably coupling the housing with the headliner, the housing configured to be positioned rearwardly of a vehicle seat within a cab;
    operably coupling a cover to the housing; and
    installing one or more components within respective voids defined by the cover.

11. The method of claim 10, further comprising:
    operably coupling the housing to a frame of the cab.

12. The method of claim 10, wherein operably coupling the housing with the headliner comprises integrally forming a substrate of the headliner and the housing.

13. The method of claim 10, further comprising:
    operably coupling the one or more components to one or more braces positioned within an interior space defined by the housing and the cover in combination.

14. The method of claim 10, wherein the cover includes a lip portion extending laterally inward of at least one of the one or more components.

15. The method of claim 14, wherein the lip portion comprises:
    a first segment positioned at least partially on a first side of the one or more components in a longitudinal direction;
    a second segment positioned at least partially vertically below the component, the second segment coupled with the first segment through a first transition segment; and
    a third segment positioned at least partially on a second side of the one or more components in a longitudinal direction that is opposite the first side, the third segment coupled with the second segment through a second transition segment.

16. A user interface for an agricultural vehicle, the user interface comprising:
   a housing configured to be positioned at least partially longitudinally rearward of a vehicle seat within a cab;
   a cover operably coupled with the housing, the cover defining a lip portion; and
   a component positioned within an interior space defined by the housing and the cover in combination, wherein the lip portion is positioned at least partially laterally inward of the component.

17. The user interface of claim 16, wherein the lip portion comprises:
   a first segment positioned at least partially on a first side of the component in a longitudinal direction;
   a second segment positioned at least partially vertically below the component, the second segment coupled with the first segment through a first transition segment; and
   a third segment positioned at least partially on a second side of the component in a longitudinal direction that is opposite the first side, the third segment coupled with the second segment through a second transition segment.

18. The user interface of claim 17, wherein the first segment extends at least partially above and at least partially below the component in a vertical direction and inwardly of the component in a lateral direction.

19. The user interface of claim 17, wherein the second segment extends at least partially inwardly of the component in a lateral direction.

20. The user interface of claim 18, wherein the third segment extends at least partially above and at least partially below the component in a vertical direction and inwardly of the component in a lateral direction.

* * * * *